United States Patent [19]
Schwan et al.

[11] Patent Number: 5,804,892
[45] Date of Patent: Sep. 8, 1998

[54] TRANSMISSION DEVICE

[75] Inventors: Ulrich Schwan, Trillenbühlstrasse 29, D-88682 Salem-Beuren; Andreas Nagel, Halver, both of Germany

[73] Assignee: Ulrich Schwan, Salem-Beuren, Germany

[21] Appl. No.: 578,566

[22] PCT Filed: Apr. 12, 1995

[86] PCT No.: PCT/EP95/01377

§ 371 Date: Feb. 15, 1996

§ 102(e) Date: Feb. 15, 1996

[87] PCT Pub. No.: WO95/28723

PCT Pub. Date: Oct. 26, 1995

[30]   Foreign Application Priority Data

Apr. 17, 1994 [DE] Germany ............... 44 12 957.2

[51] Int. Cl.⁶ ................................................. H02M 1/00
[52] U.S. Cl. ........................ 307/104; 363/16; 336/75; 174/117 R
[58] Field of Search ..................... 336/73, 75; 363/16, 363/17, 37, 51, 13, 15, 170, 171; 174/113 R, 113 A, 117 R, 129 R; 307/104; 439/887, 291

[56]          References Cited

U.S. PATENT DOCUMENTS

| | | | |
|---|---|---|---|
| 1,996,186 | 4/1935 | Affel | 174/113 R |
| 2,130,508 | 9/1938 | Peterson | 336/73 |
| 2,759,991 | 8/1956 | Rheiner | 174/113 R |
| 2,883,605 | 4/1959 | Mortimer | 363/171 |
| 2,927,260 | 3/1960 | Prywes | 363/171 |
| 3,383,456 | 5/1968 | Kosak | 174/117 R |
| 3,851,287 | 11/1974 | Miller | 336/84 R |
| 4,206,958 | 6/1980 | Hall | 439/291 |
| 4,431,860 | 2/1984 | Perco | 174/113 A |
| 4,508,934 | 4/1985 | Feldman | 174/113 R |
| 4,790,780 | 12/1988 | Bushfield | 439/887 |
| 4,808,773 | 2/1989 | Crandall | 174/113 R |
| 4,910,653 | 3/1990 | Bargroff | 363/16 |

FOREIGN PATENT DOCUMENTS

| | | |
|---|---|---|
| 3921786 | 1/1991 | Germany . |
| 2100069 | 12/1982 | United Kingdom . |

OTHER PUBLICATIONS

Finke, Miniature laminated cores of improved premeability for low frequency tranformers & reactors, Weson Technical papers, Aug. 20, 1968.

Primary Examiner—William M. Shoop, Jr.
Assistant Examiner—Peter Ganjian
Attorney, Agent, or Firm—Robert W. Becker & Associates

[57]          ABSTRACT

A device for contact-free transmission of electrical energy from at least one power supply to at least one consumer has a first transformer having connected thereto a first current converting device and a second transformer having connected thereto a second current converting device. A first endless, closed-loop electrical conductor is provided for coupling electrically in a contact-free manner the first and second transformers. At least one of the transformers supplies electrical energy to the electrical conductor and at least one of the transformers receives electrical energy from the electrical conductor.

30 Claims, 9 Drawing Sheets

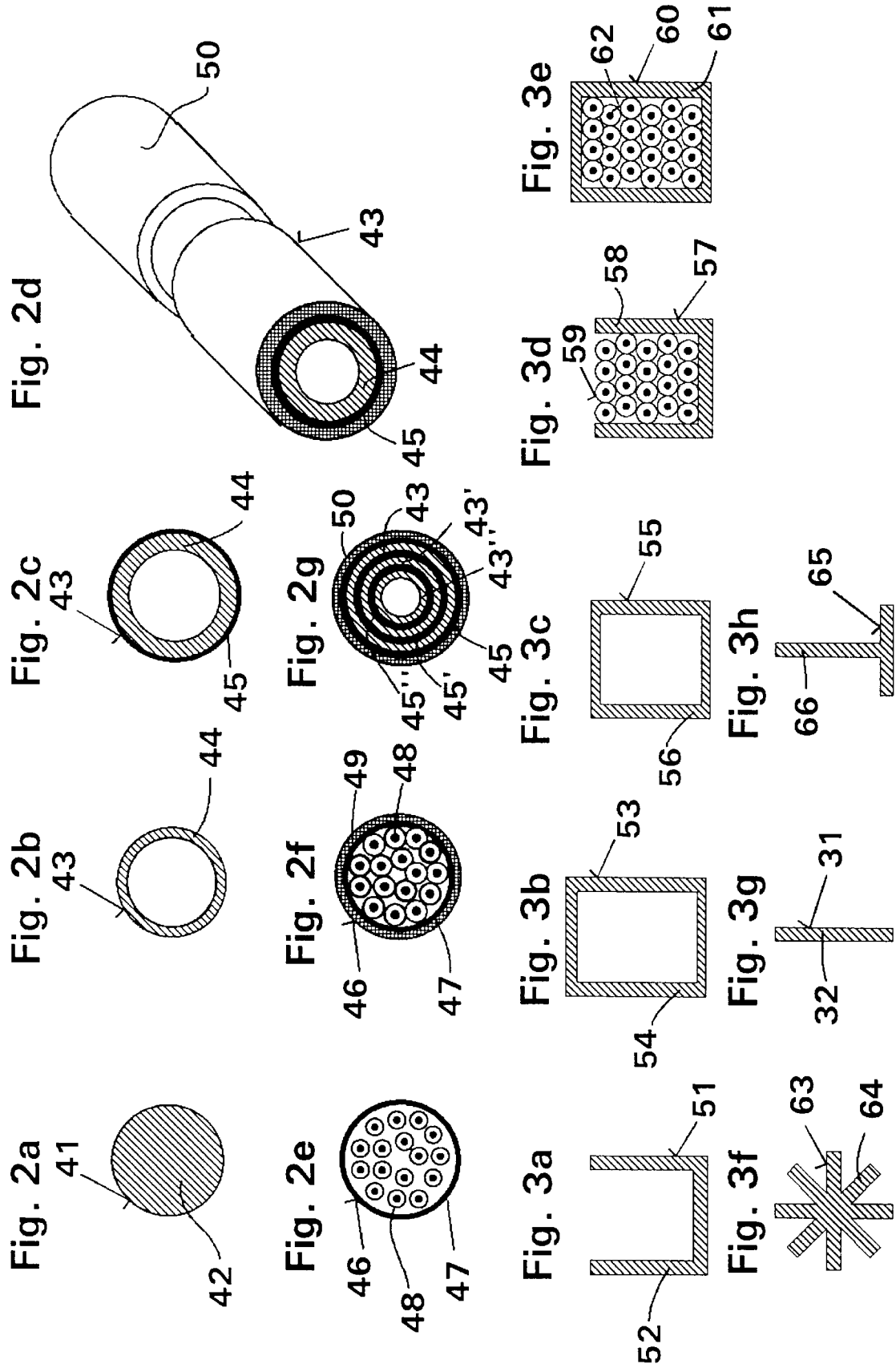

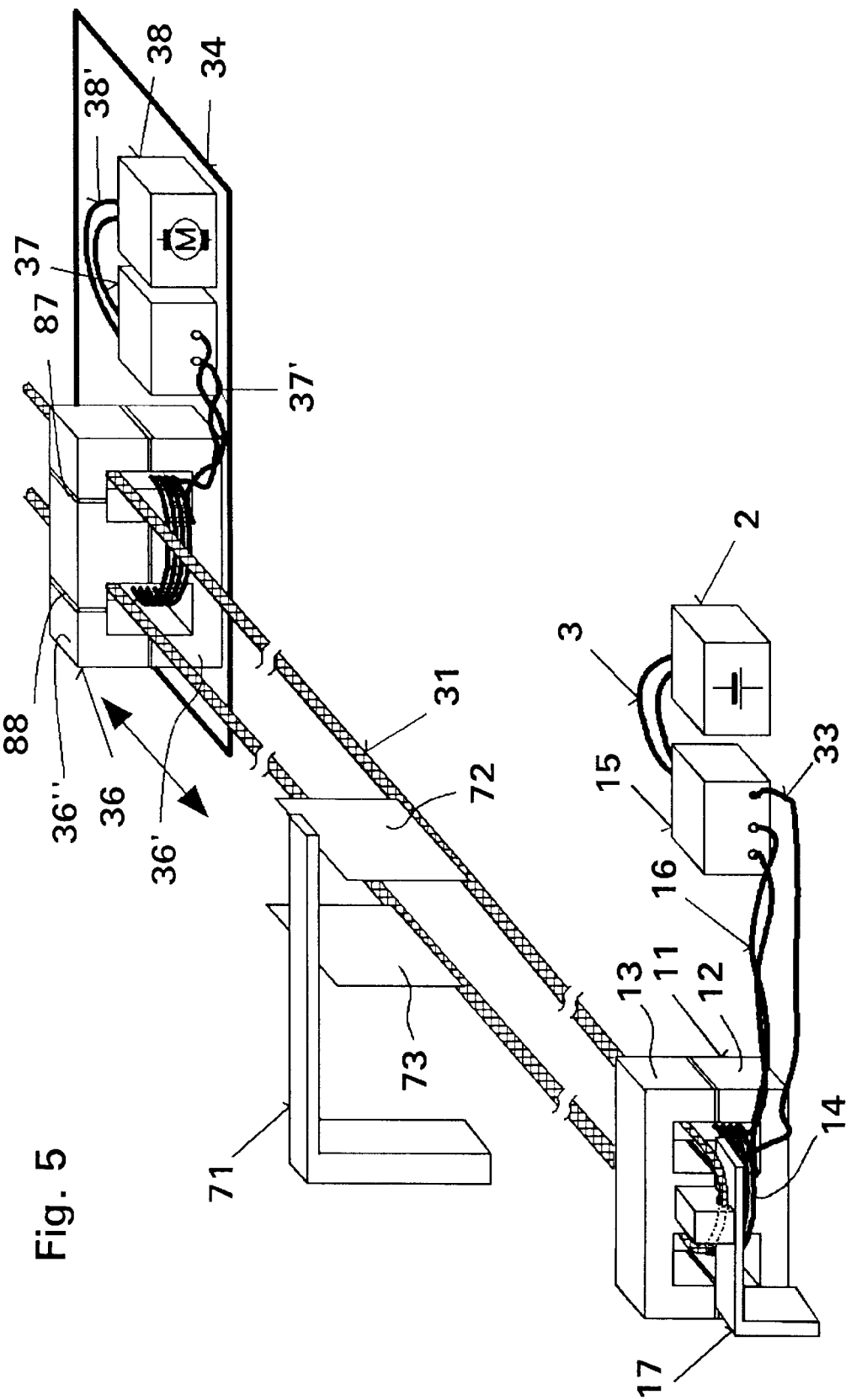

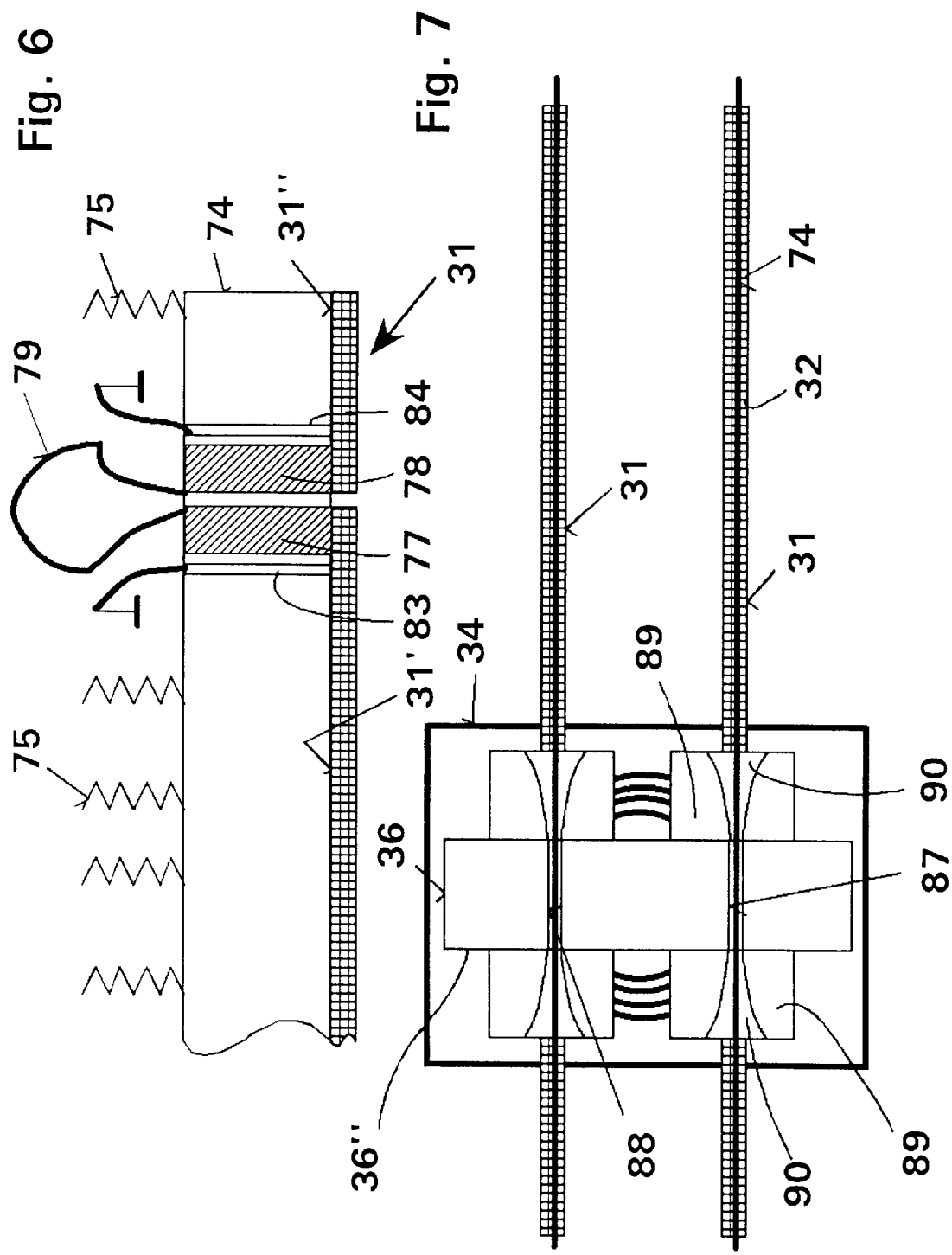

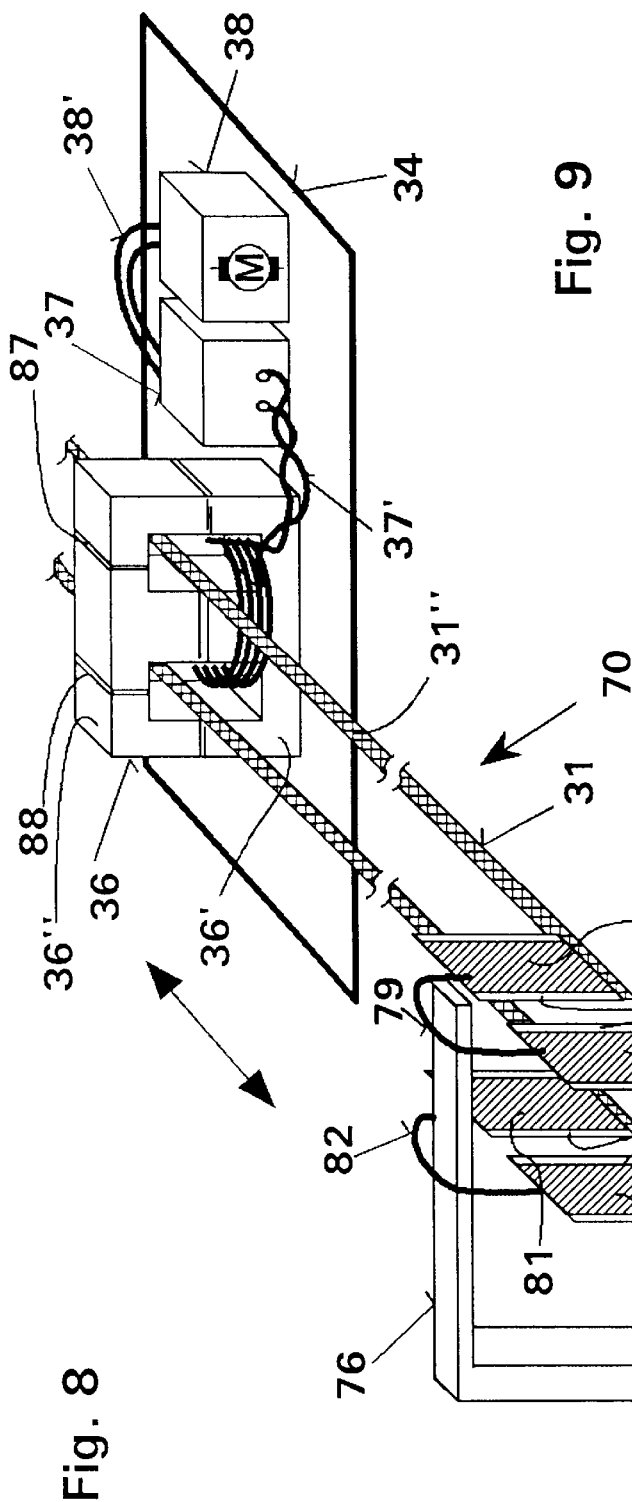
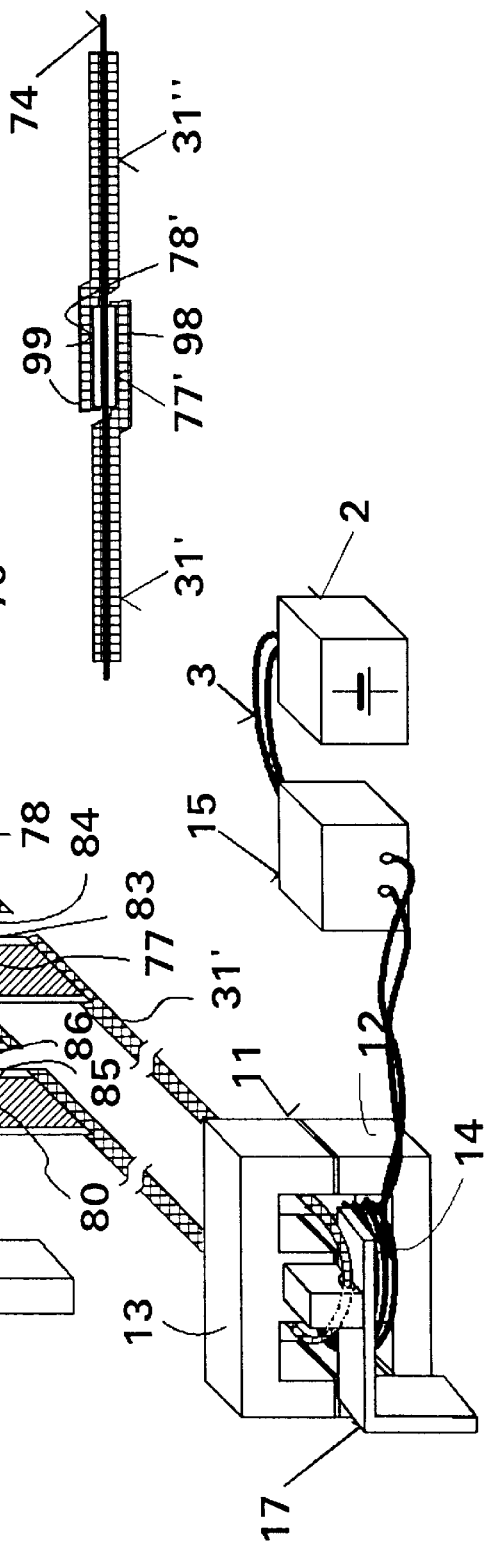
Fig. 8
Fig. 9

TRANSMISSION DEVICE

BACKGROUND OF THE INVENTION

The invention relates to a device for contact-free transmission of electrical energy from one or more power supplies to one or more consumers.

For transmitting electrical energy between machine tools or handling devices that are linearly moved relative to one another, trailing cables or slip tracks with slip contacts are used. Due to the trailing cables that have to be entrained, proper operation is often impaired. The current-carrying slip tracks must be, in order to prevent accidents by contacting, covered in a reliable manner, so that this type of energy transmission is often not feasible, especially not over longer distances, at higher velocities and/or in wet environments.

The object of the invention is thus to provide a device for contact-free transmission of electrical energy from one or more power supplies to one or more consumers which is not only extremely reliable and fail-safe, but with which it is especially possible to transmit electrical energy of high power output over long distances, at high driving velocities, as well as under water with extremely minimal losses and to supply even movable consumers with energy at any desired location. The required constructive expenditure should be minimal so that an economical manufacture is possible; furthermore, the device should be fail-safe, easily adaptable to various conditions, and usable in many applications.

SUMMARY OF THE INVENTION

According to the invention this is achieved by electrically coupling at least two transformers, provided preferably with current converting devices embodied according to resonance technology, with an electrical conductor in the form of a closed endless loop in a contact-free manner. At least one of the transformers is a feed transformer for feeding electrical energy into the electrical conductor and at least one transformer is embodied as a take-up transformer for receiving electrical energy.

The transformers should be comprised of ferromagnetic material and should have a EE, EI, UU or double ring shape.

Furthermore, it is suggested to make the electrical conductor mechanically rigid or to manufacture it from a litz wire. According to other embodiments, the conductor can also be a flat, solid, or hollow profiled member, may be comprised of two or more nested electrically conducting profiled members, be a U, T, or double T profiled member or a star-shaped profiled member. However, it is also possible to form the electrical conductor by one or more electrically conducting wires which are arranged within a rigid carrier.

Furthermore, the electrical conductor should be surrounded by an insulation layer; the electrical line can also be completely or partly surrounded by an electrically conducting sleeve in the form of an open, preferably grounded loop arranged exterior to the insulation layer.

It is furthermore very advantageous when one or more transformers coordinated with the electrical conductor can be moved in the longitudinal direction of the electrical conductor, for example, with a carriage. In this manner, it is possible to simultaneously supply a plurality of consumers with electrical energy, possibly at different locations.

When an electrical conductor extends over a greater distance, the conductor should preferably be mechanically supported.

This can be achieved such that supports are provided from which the conductor is suspended via insulation members. However, it is also possible to arrange, preferably in the area of the movable transformers, to provide support and/or guide rollers which are movable therewith. Furthermore, the conductor can be suspended over its entire length or a portion thereof with an insulating support foil and springs connected thereto.

For electrically coupling an electrical conductor which is divided into individual sections, it is expedient to arrange at the ends of the respectively associated sections of the conductor copper strips spaced from one another, which are connected via current leads with the adjacent section or with the other end of the same section. The copper strips may be in the form of plates or foils vertically arranged and suspended and preferably insulated relative to one another.

For moving a transformer across the copper strips, the transformer should be provided in their area with slot-shaped cutouts which, for centering of the support foil and/or the copper strips, should widen in a wedge shape or trumpet shape in the outward direction.

It is furthermore expedient to provide the ends of the electrically coupled sections of the conductor with oppositely arranged recesses which in the longitudinal direction of the conductor overlap and between which the copper strips are arranged.

When electrically coupling the two ends of two associated sections of an electrical conductor, the current leads connecting them can be electrically coupled to one another in a contact-free manner by a transformer which is connected via a current converting device to a power supply so that electrical energy can be introduced at any desired location.

Of course, it is also possible without problems to combine two or more electrical conductors to an electrically coupled track line. For this purpose, a transformer may be provided which preferably introduces electrical energy and with which the two conductors are coupled to one another.

For coupling a consumer to a track line comprised of two or more electrically separate conductors, the transformer coupled to the consumer should be detachable from one of the conductors and transferable to another associated conductor that is preferably selectable so that a switch is provided.

This can be achieved with a one-part or two-part cam track arranged adjacent to the electrically conducting track line with which one of the core halves of the transformer is detachable from the conductor by the movement of the carriage to which the transformer is connected, the core half is synchronously moved with the other core half part, and is again connected thereto in the area of the adjacently arranged electrical conductor.

When a device for contact-free transmission of electrical energy from one or more power supplies to one or more consumers is embodied according to the present invention, it is possible in a very simple manner to withdraw electrical energy of high power from the electrical conductor along a long distance and to provide the electrical energy to one or more consumers. Since the supply of electrical energy as well as the withdrawal of electrical energy is contact-free, mechanical and electrical losses as well as the constructive expenditure are very low so that a high operative reliability is provided, especially since the line can be insulated. Due to the current converting devices coordinated with the transformers, an optimal adaptation to the energy supply as well as the energy consumer is possible so that the consumer can be controlled and measured data which relate to the state of the consumer can be reverted. A multi-purpose use of the inventive device is thus ensured.

BRIEF DESCRIPTION OF THE DRAWINGS

In the drawing a number of embodiments of the device according to the invention for contact-free transmission of electrical energy from one or more power supplies to one or more consumers is represented which will be explained in detail in the following. It is shown, respectively in schematic representations, in:

FIGS. 2a to 3h different embodiments of the electrical conductor to be used for the device according to FIG. 1;

FIG. 5 the device of FIG. 1 with a support for the electrical conductor;

FIG. 6 a spring suspension of the electrical conductor of the device of FIG. 1;

FIG. 7 a plan view of the movable transformer of FIGS. 4 and 5;

FIG. 8 the electrical connection and support of two sections of the electrical conductor in the embodiment according to FIG. 4;

FIG. 9 another, overlapping connection of the electrical conductor of FIG. 4, in plan view;

DESCRIPTION OF PREFERRED EMBODIMENTS

Figure 1:
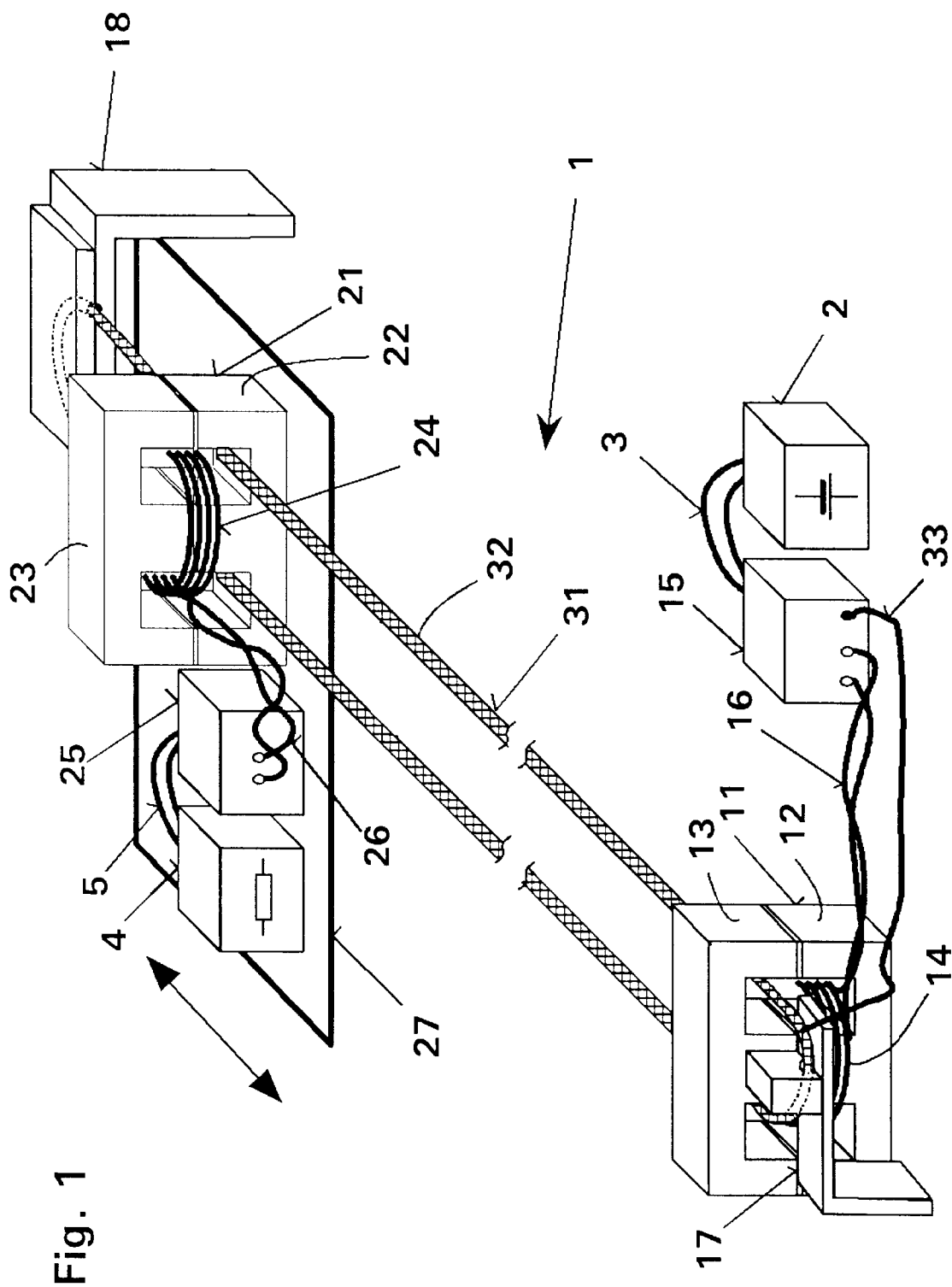
FIG. 1 a transmission device comprised of two transformers connected via an electrical conductor in the form of a loop.

The device indicated with reference numeral 1 and represented in FIG. 1 serves for the contact-free transmission of electrical energy from a power supply 2 to a consumer in the form of a resistor 4 and is comprised substantially of two transformers 11 and 21 which are electrically coupled by an electrical conductor 31. With the transformer 11 electrical energy is supplied into the conductor 31 and via the transformer 21 electrical energy is removed from the conductor 31.

The transformer 11 which is combined of two core halves 12 and 13 and which is EE-shaped has a primary coil 14 which is connected via line 16 to a current converting device 15 that is electrically connected via line 3 with the power supply 2. The transformer 21 is embodied identically and is comprised of two core halves 22 and 23. It has a secondary coil 24 that is connected via line 26 to a current converting device 25. The transformer 21 as well as the current converting device 25 are arranged on a plate 27 that is movable. Via line 5 the current converting device 25 is connected to the resistor 4.

The conductor 31 is embodied as an endless rigid loop tube and is secured at its ends with two supports 17 and 18. Furthermore, the conductor 31 is grounded with line 33 via the current converting device 15. With the transformer 11 electrical energy can be supplied to the conductor 31 which, with the aid of the transformer 21, can be withdrawn and supplied to the resistor 4.

In FIGS. 2a to 2g and 3a to 3h different embodiments of the conductor are represented, and it is shown in:

FIG. 2a a conductor 41 which is comprised of a solid profiled member 42, FIG. 2b a conductor 43 comprised of a tube 44, FIG. 2c a conductor 43 according to FIG. 2b provided with an insulation layer 45, FIG. 2d a conductor 43 according to FIG. 2b having applied to the insulation layer 45 a non-continuous sleeve 50, FIG. 2e a conductor 46 comprised of flexible wires 48 which are inserted into a tube 47 as a carrier, FIG. 2f a conductor 46 according to FIG. 2e provided with an insulation layer 49, FIG. 2g a plurality of conductors 43, 43', 43" embodied according to FIG. 2c and arranged concentrically within one another and insulated relative one another by insulating layers 45, 45', 45" and provided with a sleeve 50, FIG. 3a a conductor 51 in the form of a U-shaped profiled member 52, FIG. 3b a conductor 53 in the form of a rectangular hollow profile 54, FIG. 3c a conductor 55 in the form of a square hollow profile 56, FIG. 3d a conductor 57 which is comprised of wires 59 positioned within a U-shaped profiled member 58 as a carrier, FIG. 3e a conductor 60 comprised of a square hollow profiled member 61 as a carrier with wires 62 arranged therein, FIG. 3f a conductor 63 comprised of a star-shaped profiled member 64, FIG. 3g the conductor 31 according to FIG. 1 which is comprised of a strip 32, and FIG. 3h a conductor 65 comprised of a T-shaped profile 66.

Figure 4:
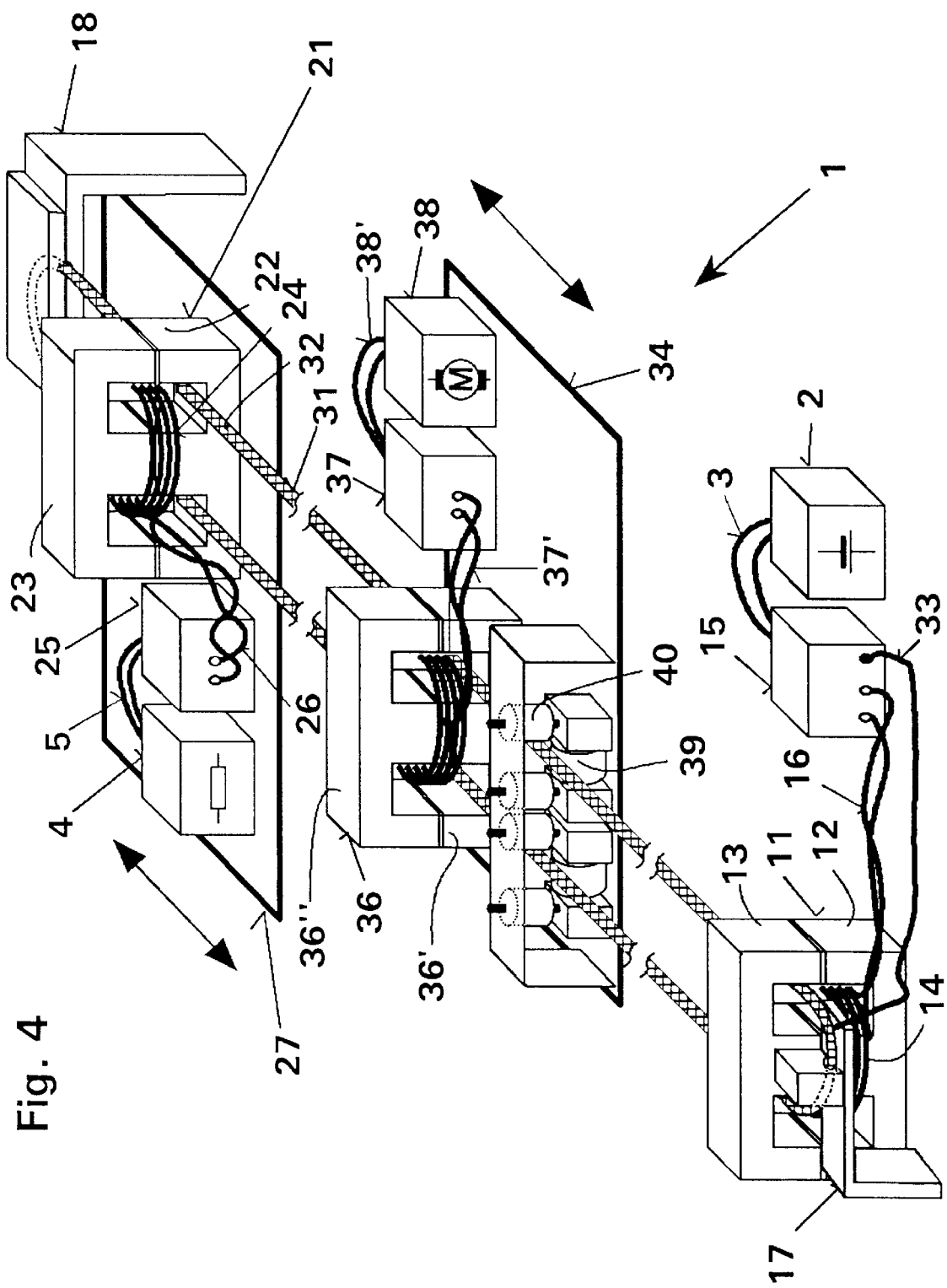
FIG. 4 the device according to FIG. 1 with a further movable transformer positioned between the transformers of FIG. 1.

In FIG. 4 it is shown that from the conductor 31 of the device 1 in the form of an endless loop electrical energy can be removed at any desired location of the conductor 31 with the aid of a further moveable transformer 36. The transformer 36 which is also comprised of two core halves 36' and 36" is arranged on a carriage 34 which is movable in the longitudinal direction of the conductor 31.

The transformer 36 has associated therewith a current converting device 37 that is connected via lines 37' to the transformer 36. Furthermore, a motor 38 is connected via line 38' to the current converting device 37 as a consumer. To the carriage 34 are connected support rollers 39 as well as guide rollers 40, laterally positioned adjacent to the conductor 31, so that the carriage is always guided properly.

FIG. 5 shows that the conductor 31, in order to prevent sagging, is suspended with the aid of support members 71. Via insulating elements 72 and 73 the conductor 31 is connected to the support member 71.

According to FIG. 6 the conductor 31, divided into individual sections 31' and 31", is suspended via an insulating support foil 74 and springs 75 connected thereto. In order for the transformer 36 of FIG. 4 to be able to move along the support foil 74, the upper core half 36", as shown in FIG. 5, is provided with slot-shaped cutouts 87 and 88 which receive the support foil 74. Furthermore, the core half 36", as shown in FIG. 7, may be provided on both sides with projections 89 which in cross-section have a trumpet-shaped widened portion 90. Thus, the support 74 is automatically centered and guided in a wear-resistant manner by the air cushion caused during movement of the transformer 36.

According to FIG. 8 the sections 31' and 31" of the conductor 31, which form a track line 70, are electrically coupled and suspended with a support member 76. For this purpose, at the ends of the sections 31' and 31" copper strips 77 and 78, respectively, 80 and 81 which are spaced at a distance to one another are provided. They are connected via current leads 79 and 82. Via the current leads 79 and 82 the sections 31' and 31" are suspended from the supports 76. With insulation plates 83 and 84, respectively, 85 and 86 the copper strip 77, 78 and 80, 81 are electrically separated from one another.

Copper strips 77' and 78', however, as shown in FIG. 9, can also be arranged on both sides of the support foil 74. In order to be able to do this, the ends of the sections 31' and 31" of the conductor 31 should be provided with overlapping recesses 98 and 99. Between the recesses and the support foil 74 the copper strips 77', 78' are arranged. Upon passing this coupling location, the energy transmission is thus only slightly impeded.

Figure 10:
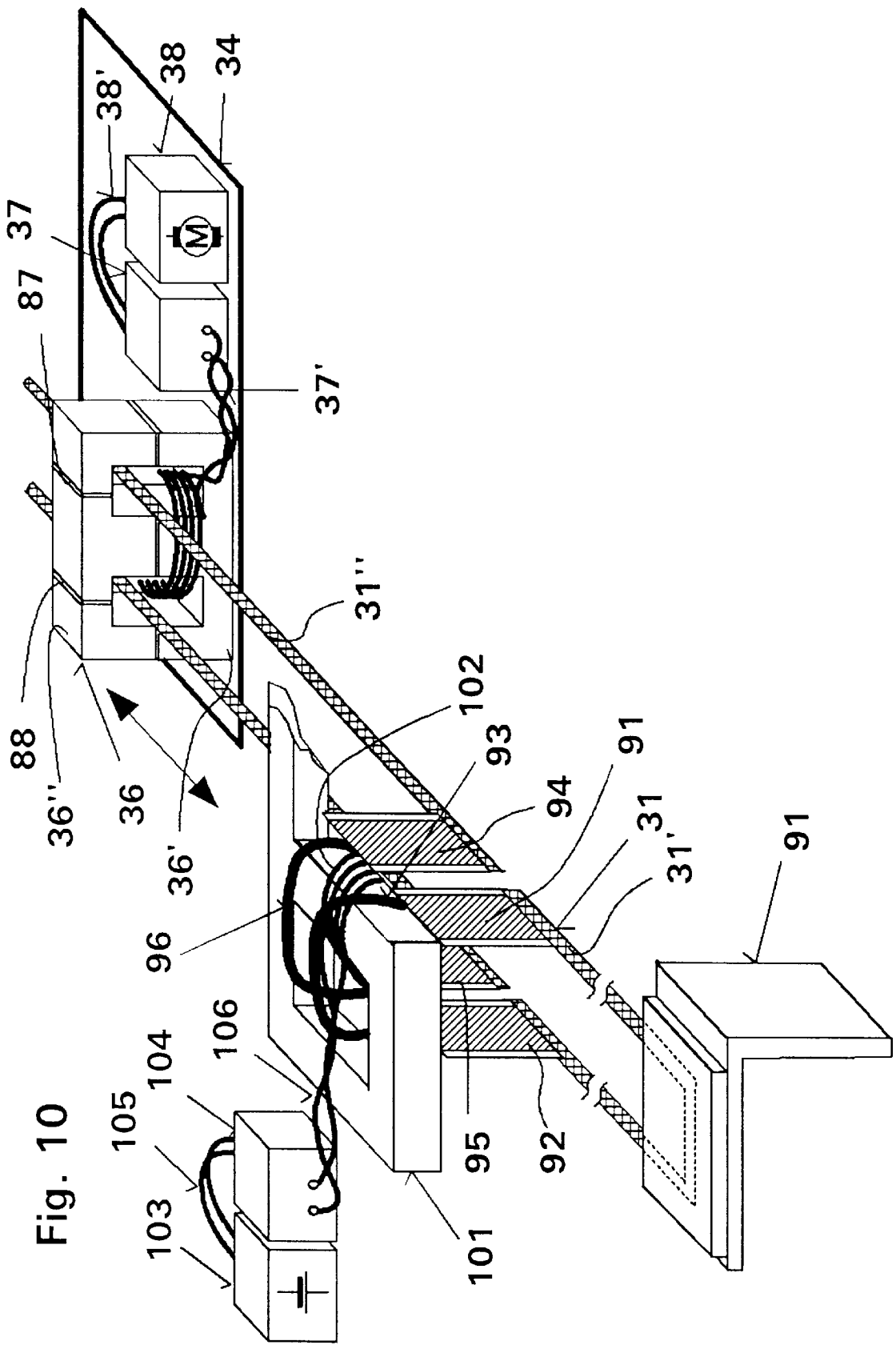
FIG. 10 the connection of two sections of the electrical conductor of FIG. 4 with a further transformer.

In the embodiment according to FIG. 10, the ends of the sections 31' as well as the ends of the sections 31" of the conductor 31 supported by a support 90 are electrically coupled with one another and are further coupled with an additional transformer 101. For this purpose, at the ends of the sections 31' and 31" copper strips 91, 92, respectively, 94, 95 are provided which are connected with one another via current leads 93 and 96. The current leads 93 and 96 are passed across the transformer 101 provided with a primary coil 102 so that electrical energy can be supplied to the two sections 31' and 31" of the conductor 31. The transformer 101 is connected via a current converting device 104 and lines 105 and 106 to a power supply 103.

Figure 11:
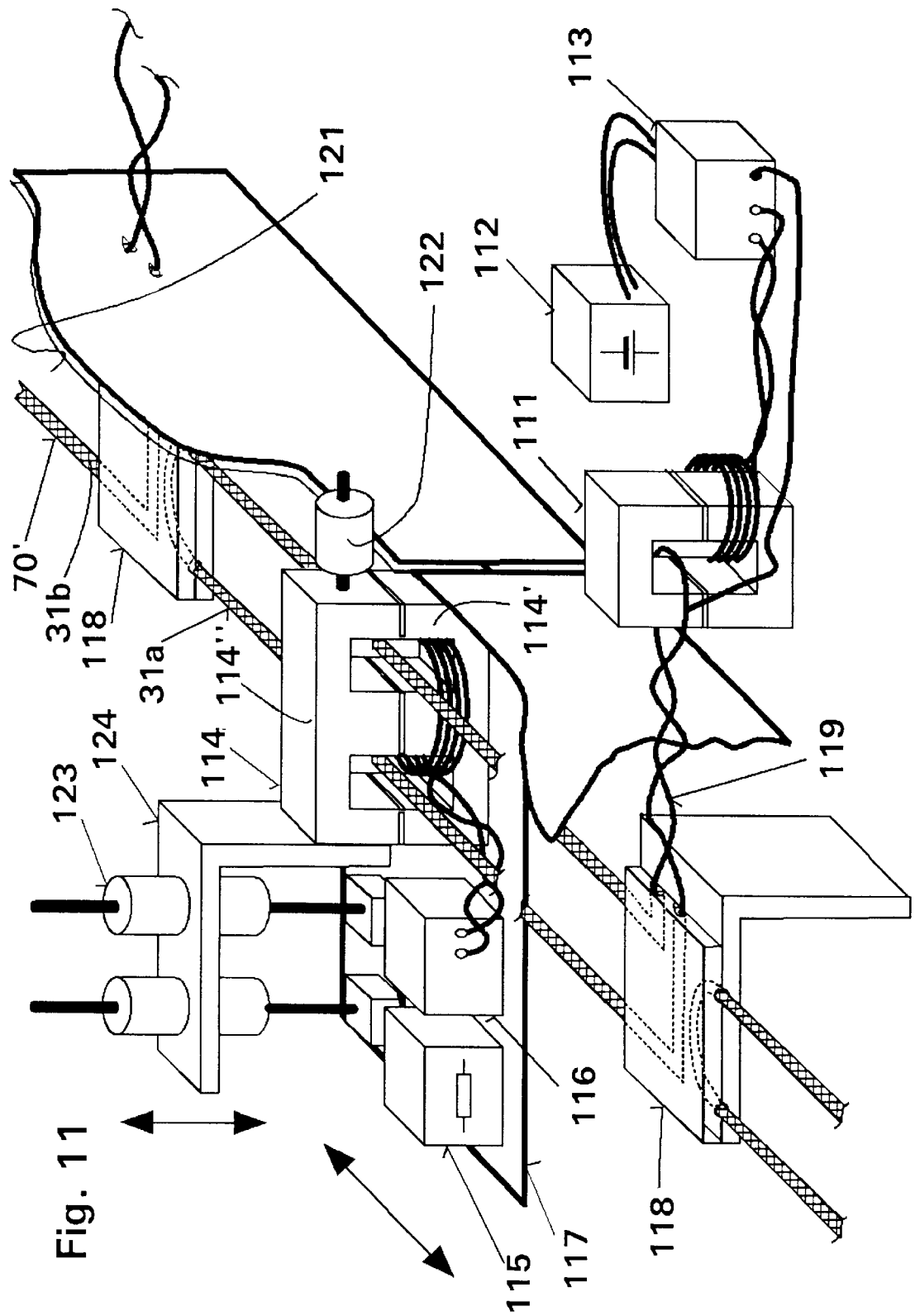
FIG. 11 the transfer of a transformer from one conductor of a track line to another which is electrically separate from the conductor.

In FIG. 11 it is shown that a transformer 114, which is movable with a carriage 117, can be transferred from one conductor 31a to another conductor 31b which together with the former conductor forms a track line 70. In this manner, the consumer 115, which is coupled via the current converting device 116 to the transformer 114, must not be disconnected from the transformer 114. In this manner a switch is provided. Of course, a transfer can also be performed to another section, for example, extending at an angle.

For this purpose, a cam track 121 arranged within the area of connection of the two conductors 31a and 31b is arranged laterally to the track, with which the upper core half 114" of the transformer 114 can be lifted from the lower core half 114' with the aid of the movement of the carriage 117 and can thus be removed from the conductor 31a and, after passing the location of separation, can be returned into the initial position so that the transformer 114 is electrically connected to the conductor 31b.

In order to be able to do this, the core half 114" is provided with a guide roller 122 which rolls along the cam track 121 as well as an angle piece 124 that is vertically guided with rods 123. The core half 114" is thus entrained during the transfer process by the carriage 117 in its lifted position.

The conductors 31a and 31b are clamped between supports 118. The transformer 111, with which electrical energy is supplied to the conductors 31a and 31b via line 119, is electrically connected via a current converting device 113 with the power supply 112.

Figure 12:
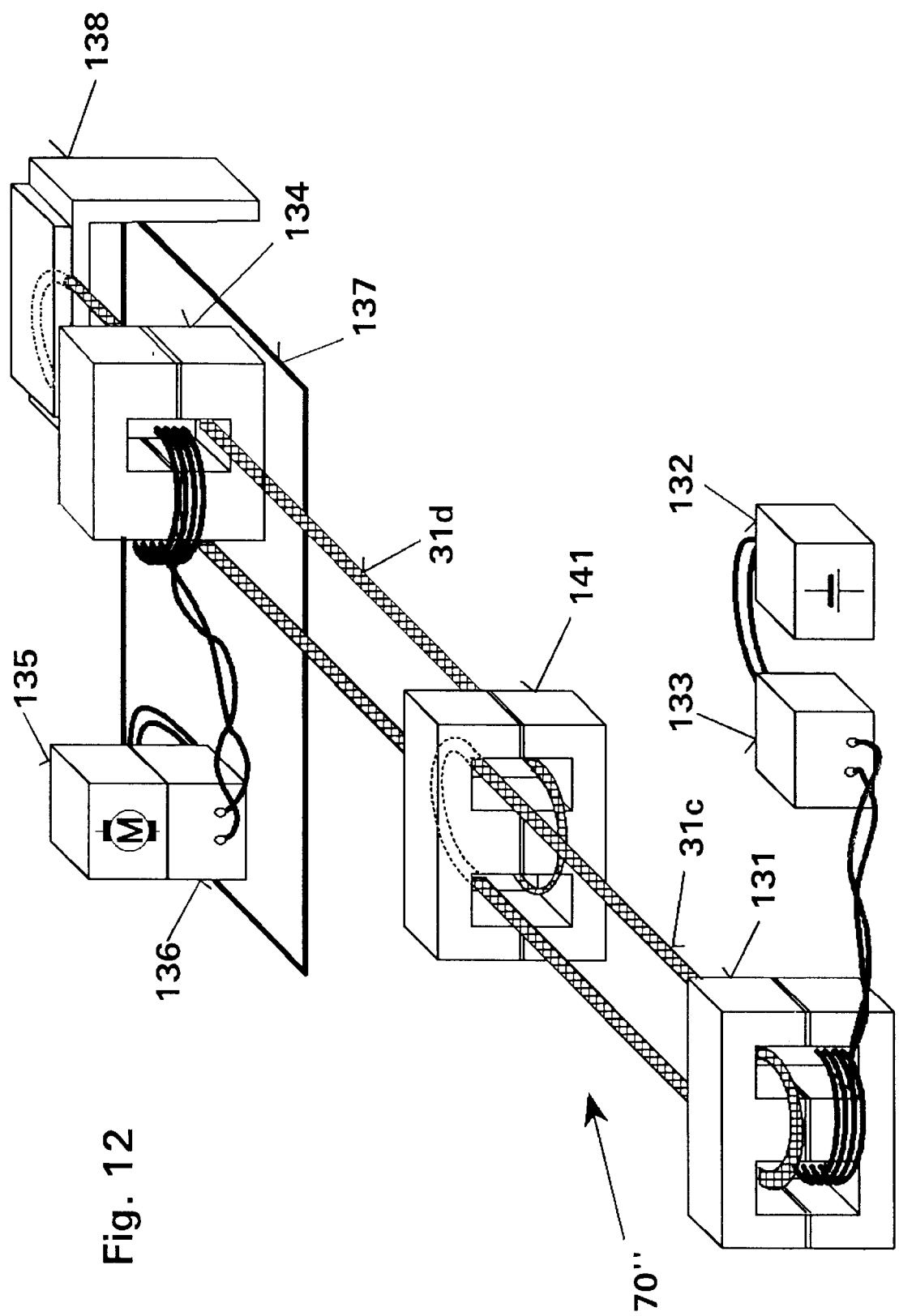
FIG. 12 the coupling of two electrical conductors with a transformer.

According to FIG. 12, a track 70" is comprised of two conductors 31c and 31d which are coupled to one another by transformer 141. With a transformer 131 that is connected with a current converting device 133 to a power supply 132, electrical energy is introduced into the track line 70" and with the aid of a transformer 134, positioned on the movable carriage 137, the electrical energy is supplied via current converting device 136 to an electric motor 135 as a consumer. The conductor 31c is supported by the two transformers 131 and 141, and the conductor 31b is supported by the transformer 141 and a support member 138.

The present invention is, of course, in no way restricted to the specific disclosure of the specification and drawings, but also encompasses any modifications within the scope of the appended claims.

We claim:

1. A device for contact-free transmission of electrical energy from at least one power supply to at least one consumer; said device comprising:

a first transformer having connected thereto a first current converting device;

a second transformer having connected thereto a second current converting device;

a first endless, closed-loop electrical conductor coupling electrically in a contact-free manner said first and second transformers; and wherein at least one of said transformers supplies electrical energy to said electrical conductor and wherein at least one of said transformers receives electrical energy from said electrical conductor.

2. A device according to claim 1, further comprising at least one third transformer electrically connected in a contact-free manner to said electrical conductor so as to be moveable along said electrical conductor in a longitudinal direction of said electrical conductor.

3. A device according to claim 2, further comprising a carriage to which said at least one third transformer is connected, wherein said carriage is moveable along said electrical conductor in said longitudinal direction.

4. A device according to claim 3, further comprising supporting rollers connected to said carriage for mechanically supporting said electrical conductor.

5. A device according to claim 4, wherein said means for mechanically supporting said electrical conductor is a support member with insulating elements connected thereto, wherein said electrical conductor is suspended from said insulating elements.

6. A device according to claim 1, further comprising means for mechanically supporting said electrical conductor.

7. A device according to claim 6, wherein said means for mechanically supporting said electrical conductor comprises a support foil connected to said electrical conductor at least along portions of its length and further comprises springs connected to said support foil for suspending said support foil and said electrical conductor.

8. A device according to claim 7, further comprising at least one third transformer electrically connected in a contact-free manner to said electrical conductor so as to be moveable along said electrical conductor in a longitudinal direction of said electrical conductor, wherein said at least one third transformer comprises slot-shaped cutouts for accommodating said support foil, said slot-shaped cutouts widening in an outward direction.

9. A device according to claim 1, wherein:

said electrical conductor is comprised of at least one section with distal ends;

said distal ends comprise copper strips;

said electrical conductor further comprises electrical leads; and said electrical leads electrically connect said copper strips of adjacent ones of distal ends.

10. A device according to claim 9, wherein said copper strips are vertically arranged and suspended and are insulated relative to one another.

11. A device according to claim 10, wherein said copper strips are plates.

12. A device according to claim 10, wherein said copper strips are foils.

13. A device according to claim 10, further comprising at least one third transformer electrically connected in a contact-free manner to said electrical conductor so as to be moveable along said electrical conductor in a longitudinal direction of said electrical conductor, wherein said at least one third transformer for travelling across said copper strips comprises slot-shaped cutouts.

14. A device according to claim 13, wherein said slot-shaped cutouts widen in an outward direction.

15. A device according to claim 9, wherein adjacent ones of said distal ends overlap in a longitudinal direction of said electrical conductor and wherein in the area of overlap said distal ends have oppositely recessed portions, wherein said copper strips are arranged between said oppositely recessed portions.

16. A device according to claim 9, comprising two of said sections and further comprising an auxiliary transformer, an auxiliary power supply, and an auxiliary current converting device, wherein said auxiliary transformer is connected with said auxiliary current converting device to said auxiliary power supply, wherein each one of said sections has said copper strips of said distal ends electrically connected by one of said electrical leads and wherein said electrical leads are electrically coupled in a contact-free manner with said auxiliary transformer.

17. A device according to claim 1, wherein said current converting devices are operated in resonance with said transformers.

18. A device according to claim 1, wherein said transformers consist of a ferromagnetic material and have a shape selected from the group consisting of an EE shape, an El shape, a UU shape, and double ring shape.

19. A device according to claim 1, wherein said electrical conductor is mechanically rigid.

20. A device according to claim 1, wherein said electrical conductor is Litz wire (stranded wire).

21. A device according to claim 1, wherein said electrical conductor is comprised of an electrically conducting profiled member selected from the group consisting of a flat profiled member, a solid profiled member, and a hollow profiled member.

22. A device according to claim 1, wherein said electrical conductor is comprised of an electrically conducting profiled member having a cross-section selected from the group consisting of a U-shape, a T-shape, an I-shape and a star-shape.

23. A device according to claim 1, wherein said electrical conductor is comprised of at least two electrically conducting nested profiled members.

24. A device according to claim 1, wherein said electrical conductor is comprised of at least one electrically conducting wire and a rigid hollow carrier, wherein said at least one electrically conducting wire is positioned within said rigid hollow carrier.

25. A device according to claim 1, wherein said electrical conductor comprises an external insulation layer.

26. A device according to claim 25, wherein said electrical conductor further comprises an electrically conducting sleeve surrounding said external insulation layer and covering said external insulation layer at least partially, wherein said electrically conducting sleeve is in the form of an open grounded loop.

27. A device according to claim 1, further comprising at least one an additional electrical conductor wherein said first electrical conductor and said at least one additional electrical conductor are combined to an electrically coupled track line.

28. A device according to claim 27, further comprising an additional transformer for connecting a consumer to said device, wherein said additional transformer is detachably connected to said first electrical conductor and said at least one additional electrical conductor so as to be transferable to a selected one of said first electrical conductor and said at least one additional electrical conductor.

29. A device according to claim 28, further comprising:

a cam track having at least one cam surface for transferring said additional transformer between said first electrical conductor and said at least one additional electrical conductor;

a carriage to which said additional transformer is connected for moving said additional transformer along said track line;

wherein said additional transformer is comprised of two core halves that are detachable;

wherein one of said core halves, upon displacement of said carriage, cooperates with said cam track such that said one core half is detached from the electrical conductor at which said transformer is positioned, is moved synchronously with the other core half to another one of said electrical conductors and reconnected with the other core half.

30. A device according to claim 27, further comprising an electrical feed transformer for electrically coupling said first electrical conductor and said at least one additional electrical conductor.

* * * * *